United States Patent
Sagae et al.

(10) Patent No.: US 6,443,289 B1
(45) Date of Patent: Sep. 3, 2002

(54) ONE-WAY CLUTCH APPARATUS

(75) Inventors: Atsushi Sagae; Rikio Kawabe, both of Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/615,082

(22) Filed: Jul. 12, 2000

(30) Foreign Application Priority Data

Jul. 15, 1999 (JP) ............................................. 11-202061

(51) Int. Cl.⁷ ............................................... F16D 41/00
(52) U.S. Cl. ................................. 192/113.32; 192/45.1; 192/41 A
(58) Field of Search ........................... 192/45.1, 113.32, 192/41 A, 110 B

(56) References Cited

U.S. PATENT DOCUMENTS

| | | | | |
|---|---|---|---|---|
| 5,320,204 A | * | 6/1994 | Riggle et al. | 192/45.1 |
| 5,601,175 A | * | 2/1997 | Kinoshita et al. | 192/113.32 |
| 5,671,836 A | | 9/1997 | Shirataki et al. | 192/113.32 |
| 5,687,826 A | * | 11/1997 | Kinoshita et al. | 192/113.32 |
| 2001/0001996 A1 | * | 5/2001 | Shirataki et al. | 192/45.1 |

* cited by examiner

Primary Examiner—Saúl Rodriguez
(74) Attorney, Agent, or Firm—Miles & Stockbridge P.C.

(57) ABSTRACT

A one-way clutch apparatus comprises an inner race provided with a lubricating oil supply path open to the outer peripheral surface formed thereon, an outer race supported to be coaxial and relatively rotatable with respect to the inner race, a one-way clutch mechanism interposed between the inner race and the outer race; and a pair of retainers fixed to the both ends of the outer race for regulating an axial movement of the one-way clutch mechanism. A lubricating oil passage is formed between at least one of the retainers and the outer race for guiding the lubricating oil in the radially outward direction.

27 Claims, 6 Drawing Sheets

ONE-WAY CLUTCH APPARATUS

This application claims the benefits of Japanese Application No. 11-202061 which is hereby incorporated by reference.

BACKGROUND OF THE INVENTION

1. Field of the Invention

The present invention relates to a one-way clutch apparatus for constituting an automatic transmission, or the like, for a car, and more specifically, to a technology for achieving smooth lubrication, etc., with respect to frictional engagement means.

2. Related Background Art

Generally, an automatic transmission for a car comprises a planetary gear mechanism capable of 3 to 5 speed change, in addition to a torque converter serving as a fluid coupling, so as to conduct the speed change by properly fixing or releasing the constituent elements of the planetary gear mechanism (a sun gear, a planetary gear, etc.) with frictional engagement means such as a clutch or a brake. As the frictional engagement means to be assembled in the automatic transmission, a wet-type multi-disc type means which comprises friction discs or plates and separator discs or plates alternately provided therein is employed, with some exceptions of band-type brakes. For the pressure contacting (frictional engagement) of the both plates, pressure oil from a gear change control oil pressure circuit is employed. Some of such frictional engagement means incorporate a one-way clutch apparatus therein, so as to freely rotate a gear shaft, or the like, in one direction, thereby realizing easier gear change control.

FIG. 7 is a longitudinal sectional view for showing the essential part of a conventional one-way clutch apparatus which is incorporated in the frictional engagement means. In FIG. 7, the one-way clutch apparatus 1 is comprised of an inner race 5 on which a lubricating oil supply bore 3 open to the outer peripheral surface is formed, an outer race 7 which is supported to be coaxial and relatively rotatable with respect to this inner race 5, a one-way clutch mechanism 9 of a sprag type which is interposed between the inner race 5 and the outer race 7, and a pair of retainers 11 which are fixed to the both ends of the outer race 7 for regulating an axial movement of this one-way clutch mechanism 9. In this one-way clutch apparatus 1, the outer race 7 is integrally formed with a hub 15 of a wet-type multi-disc clutch which is provided outwardly in the radial direction, and a spline 27 with which a friction plate, or the like, is engaged is formed on the outer peripheral surface of the hub 15. In FIG. 7, a member denoted by a reference numeral 29 is a Zytel washer 29 which serves as a sliding bearing to be contacted with a side surface of the retainer 11 in a sliding manner.

The one-way clutch mechanism 9 is comprised of a large number of sprags 31 each serving as a torque transmitting element, a ribbon spring 33 for retaining the sprags 31 and, at the same time, biasing the sprags 31 in the direction of engagement, an outer retainer 35 for annularly retaining the ribbon spring 33, an inner retainer 37 for suppressing an excessive inclination of the sprags 31 together with the outer retainer 35, and a pair of end bearings 39 for retaining the both retainers 35 and 37 with a predetermined space therebetween, so as to ensure an operation of the sprags 31. Elastic claws 41 which are contacted with the outer race 7 in a sliding manner are formed at several positions on the outer retainer 35. An appropriate drag torque is generated between the outer race 7 and the one-way clutch mechanism 9 by these elastic claws 41, so as to prevent a sliding at the time of engagement of the one-way clutch mechanism 9 and, at the same time, to prevent local wear from occurring in the outer race 7 and the inner race 5.

In the one-way clutch apparatus described above, supply of the lubricating oil to the frictional engagement means is not conducted smoothly, so that wear of the friction plate, and the like, may be brought about.

The one-way clutch mechanism 9 presses the outer race 7 and the inner race 5 by means of the sprags 31 at the time of engagement, while sliding contacting with the inner race 5 at the time of idling. When the one-way clutch mechanism 9 and the outer race 7 are relatively rotated with each other at the time of vibration or engagement, the elastic claws 41 sliding contact with the inner peripheral surface of the outer race 7.

Accordingly, the lubricating oil is supplied by pressure into the one-way clutch mechanism 9 from the lubricating oil supply bore 3 of the inner race 5, and a lubricating oil film is formed between the constituent elements of the one-way clutch mechanism 9 and the outer race 7 and the inner race 5, so as to prevent wear of these members.

Incidentally, in a one-way clutch apparatus for an automatic transmission, the frictional engagement means is provided on the outer peripheral side of the outer race, so that lubrication of the constituent elements thereof (the friction plates, the separator plates, and the like) becomes required. However, in the conventional one-way clutch apparatus 1 described above, the lubricating oil which flows into the one-way clutch mechanism 9 is blocked by the retainer 11 and the Zytel washer 29, so as to prevent the lubricating oil from flowing into the frictional engagement means. For this reason, the frictional surface of the friction plate, or the like, is worn in a comparatively short period of operation, and it is feared that the engaging performance of the frictional engagement means may be damaged in the comparatively short period of operation. In order to solve this problem, it is considered to provide a lubricating oil supply path separately. In this case, however, the processing cost may be increased or the axial length of the automatic transmission may be extended.

SUMMARY OF THE INVENTION

The present invention is contrived taking the circumstances described above into consideration, and the object of the invention is to provide a one-way clutch for achieving smooth lubrication with respect to frictional engagement means, while employing a comparatively simple structure.

In order to solve the above-described problems, the present invention provides, a one-way clutch comprising an inner race on which a lubricating oil supply path open to the outer peripheral surface is formed, an outer race which is supported to be coaxial and relatively rotatable with respect to this inner race, a one-way clutch mechanism which is interposed between the inner race and the outer race, and a pair of retainers fixed to the both ends of the outer race for regulating an axial movement of the one-way clutch, wherein a lubricating oil passage is formed between at least one of the retainers and the outer race for guiding the lubricating oil in the radially outward direction.

According to the present invention, the lubricating oil which flows into the one-way clutch mechanism passes through the lubricating oil passage and is supplied to the wet-type multi-disc clutch, or the like, which is provided outward in the radial direction of the outer race. The lubricating oil is then used for lubrication of the friction plates, etc.

Also, in the one-way clutch of the present invention, one of the retainers may be extended from a hub of frictional engagement means or mechanism provided outside in the radial direction of the outer race. According to this preferable feature, it is possible to realize weight reduction or cost reduction of the apparatus by molding the hub of steel plate by pressing, for example, and by forming the retainers integrally with the hub.

Further, in the one-way clutch of the present invention, the other of the retainers may be made of resin material and have an engagement portion engaged with an annular groove formed on the outer periphery of the outer race. According to this preferable feature, it is possible to enhance the mass productivity and to realize easy attachment or detachment of the retainers to or from the outer race by molding, for example, the retainers of synthetic resin by injection molding. Further the Zytel washer may be omitted, depending on the lubricating performance of the material.

DESCRIPTION OF THE PREFERRED EMBODIMENT

Figure 1:
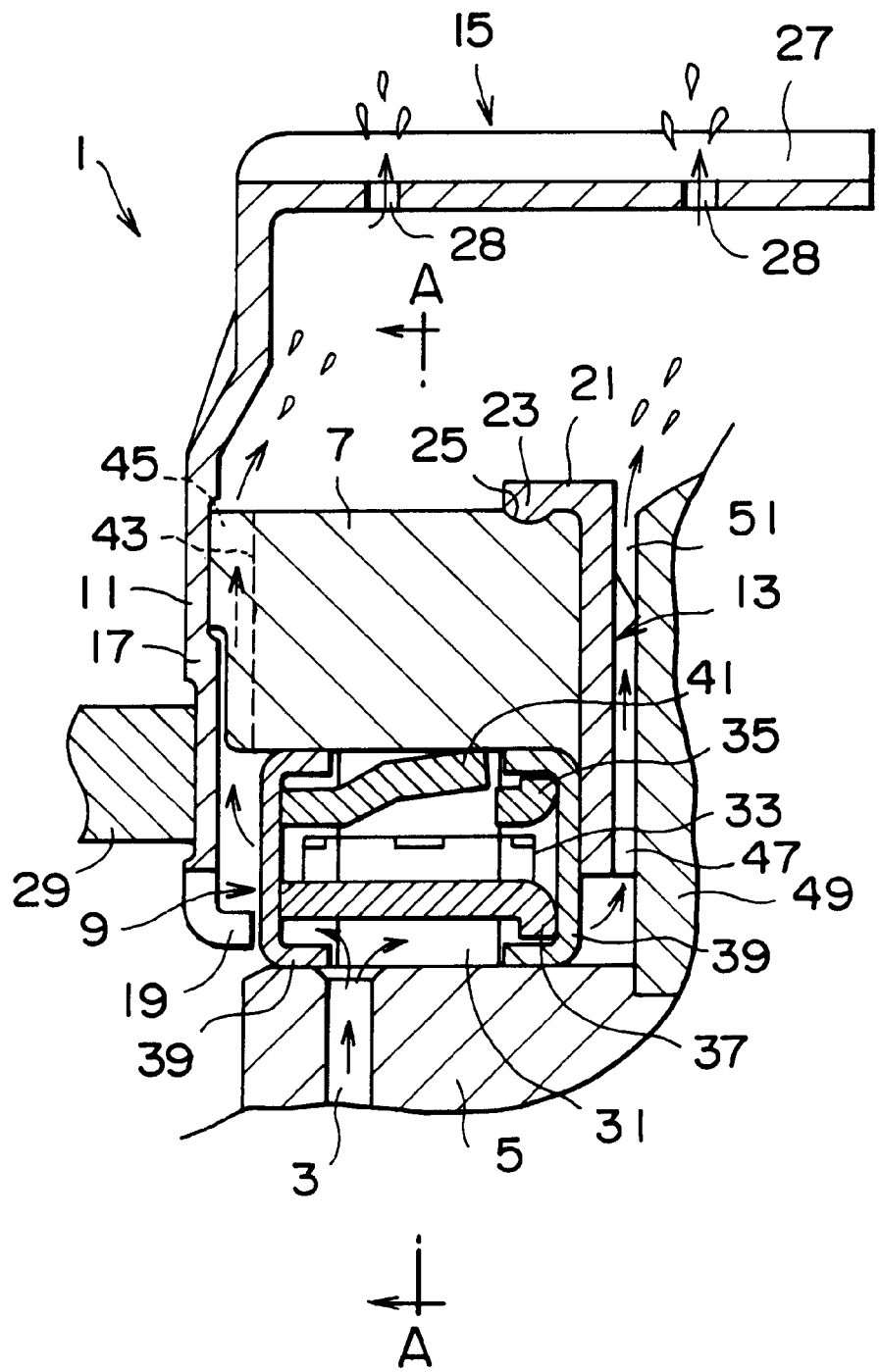
FIG. 1 is a longitudinal sectional view of the essential part of the one-way clutch apparatus according to one embodiment of the present invention.
Figure 2:
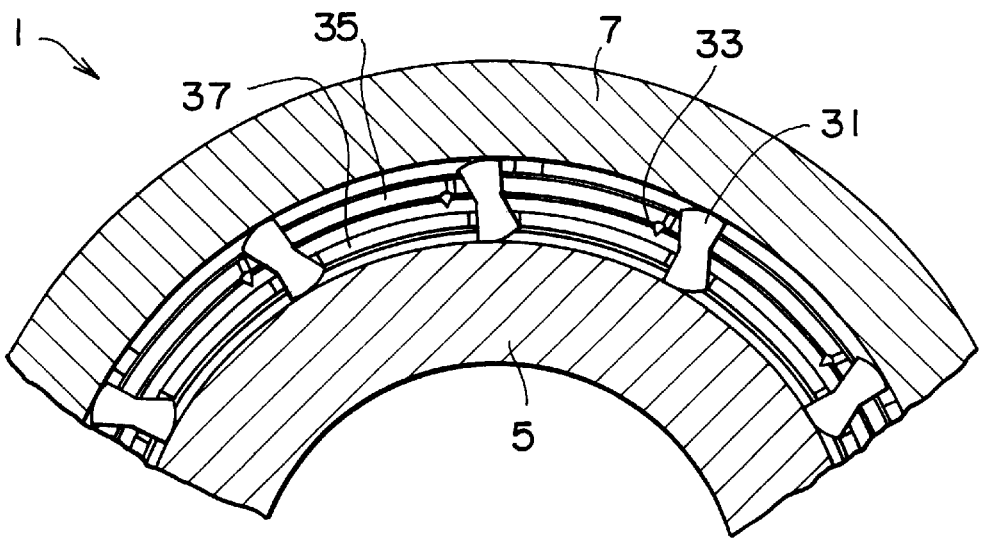
FIG. 2 is a sectional view of the apparatus of FIG. 1, taken along line A—A in FIG. 1.

Detailed description will be made below on an embodiment of a one-way clutch apparatus according to the present invention with reference to the drawings. FIG. 1 is a longitudinal sectional view of the essential part of a one-way clutch apparatus according to a first embodiment of the present invention, while FIG. 2 is a sectional view of a part of FIG. 1, taken along line A—A in FIG. 1. The one-way clutch apparatus of the present embodiment is incorporated in a wet-type multi-disc clutch for an automatic transmission which, however, has nothing to do with the gist of the present invention. Accordingly, description of the wet-type multi-disc clutch will be omitted. Note that in the description of the embodiment, the left side in FIG. 1 is considered to be the front side of the apparatus, for convenience sake. As shown in FIG. 1 and FIG. 2, the one-way clutch apparatus 1 is composed of an inner race 5 which is provided with a lubricating oil supply bore 3 open to the outer peripheral surface thereof, an outer race 7 which is supported to be coaxial and relatively rotatable with respect to the inner race 5, a one-way clutch mechanism 9 of a sprag type which is interposed between the inner race 5 and the outer race 7, and front and rear retainers 11 and 13 which are fixed to the both ends of the outer race 7 for regulating a movement of the one-way clutch in the axial direction.

In the one-way clutch apparatus 1 of the present embodiment, a wet-type multi-disc clutch is provided outward in the radial direction of the outer race 7, and the front retainer 11 is extended radially inwardly from a hub 15 which is molded of steel plate by pressing for constituting this wet-type multi-disc clutch. The front retainer 11 is comprised of a mirror plate portion 17 which is welded to the front end surface of the outer race 7, and a flange-shaped retainer portion 19 which is bent backward from the inner peripheral end of the mirror plate portion 17. On the other hand, the rear retainer 13 is molded of synthetic resin by injection, and a plurality of flange-shaped engagement portions 21 fitted on the rear end portion of the outer race 7 are formed on the front end surface of the rear retainer 13. An arcuate projection 23 is formed at the tip end of the inner peripheral part of each of the engagement portions 21. This arcuate projection 23 is fitted in an annular groove 25 which is formed on the outer peripheral surface of the rear part of the outer race 7. Note that a spline 27 with which friction plates of the wet-type multi-disc clutch are engaged is formed on the outer peripheral surface of the hub 15. The hub 15 is also provided with lubricating oil supply bores 28 for communication between the inner peripheral surface and the outer peripheral surface thereof. In FIG. 1, a member denoted by a reference numeral 29 is a Zytel washer 29 which serves as a sliding bearing and is sliding contacted with the front end surface of the front retainer 11.

Figure 3:
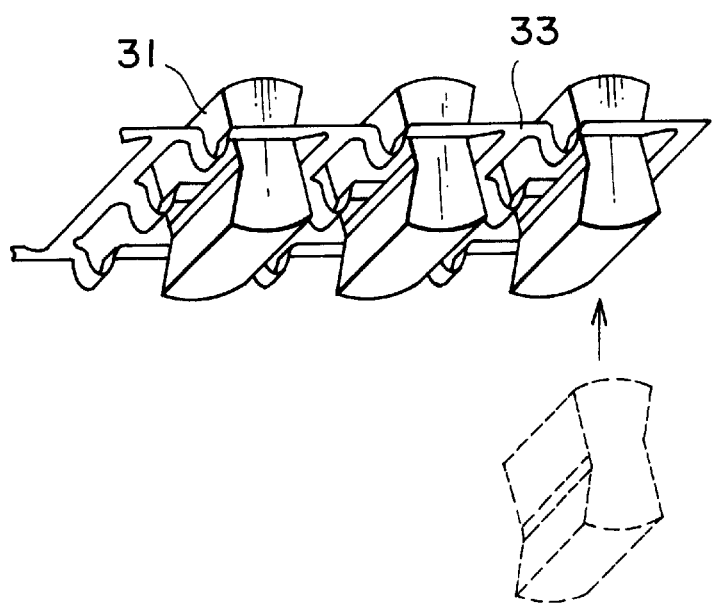
FIG. 3 is a perspective view for showing the sprags and a ribbon spring in a state of being combined with each other.
Figure 4:
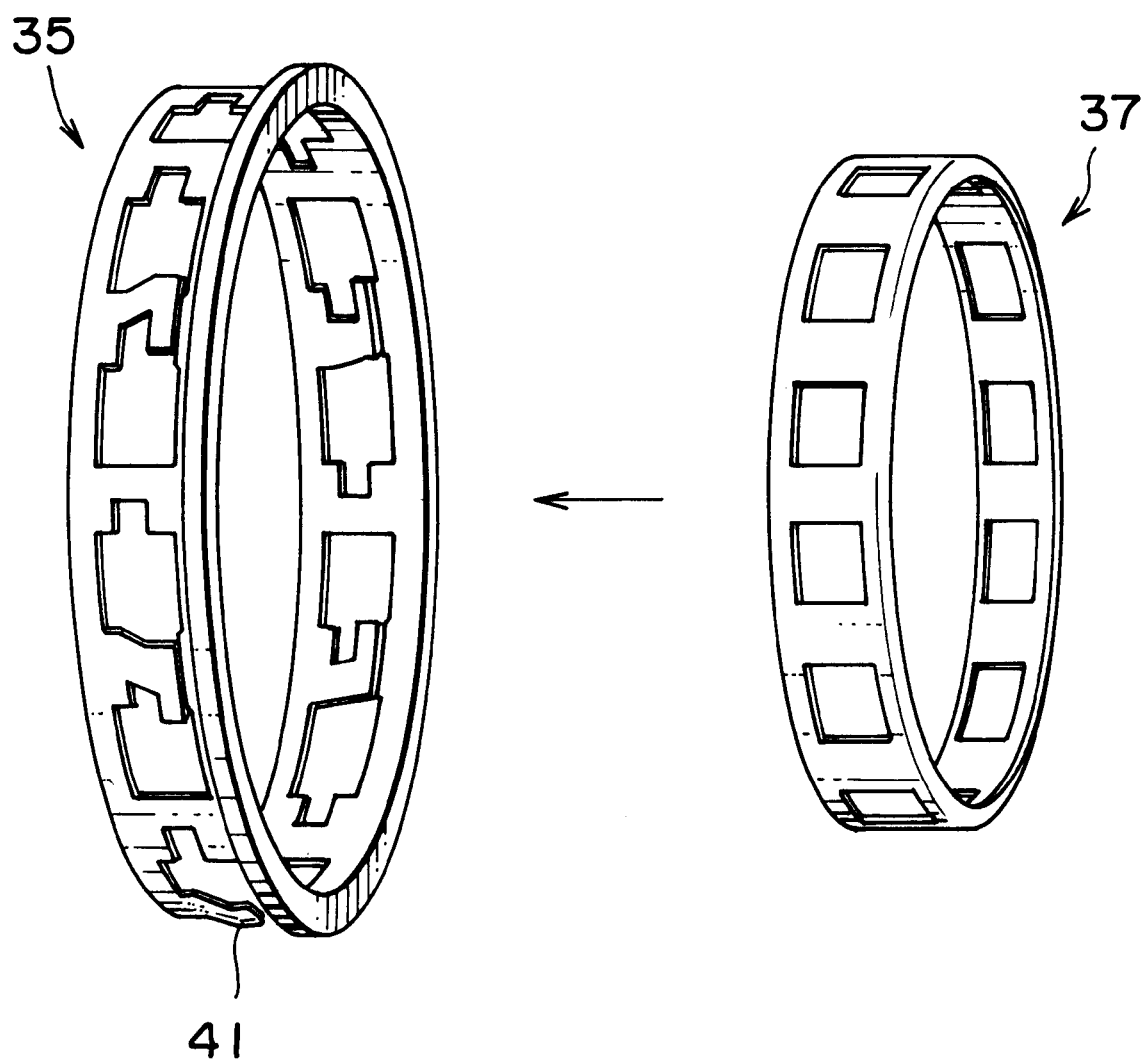
FIG. 4 is a perspective view for showing the outer retainer and the inner retainer in a state of being arranged before and behind.

The one-way clutch mechanism 9 is comprised of a large number of sprags 31 each serving as a torque transmitting element, a ribbon spring 33 for retaining each of the sprags 31 and, at the same time, biasing each sprag in the direction of engagement, an outer retainer 35 for annularly retaining the ribbon spring 33, an inner retainer 37 for suppressing an excessive inclination of each sprag 31 together with the outer retainer 35, and a pair of front and rear end bearings 39 for retaining the both retainers 35 and 37 with a predetermined space therebetween so as to ensure an operation of the sprag 31. Elastic claws 41 which are sliding contacted with the outer race 7 are formed at several positions on the outer retainer 35. An appropriate drag torque is generated between the outer race 7 and the one-way clutch mechanism 9 by these elastic claws 41, so as to prevent idling of the one-way clutch mechanism 9 at the time of engagement and, at the same time, to prevent local wear from occurring in the outer race 7 and the inner race 5. FIG. 3 is a perspective view for showing the sprags 31 and the ribbon spring 33 in a state of being combined with each other, while FIG. 4 is a perspective view for showing the outer retainer 35 and the inner retainer 37 arranged in front and in rear.

Figure 5:
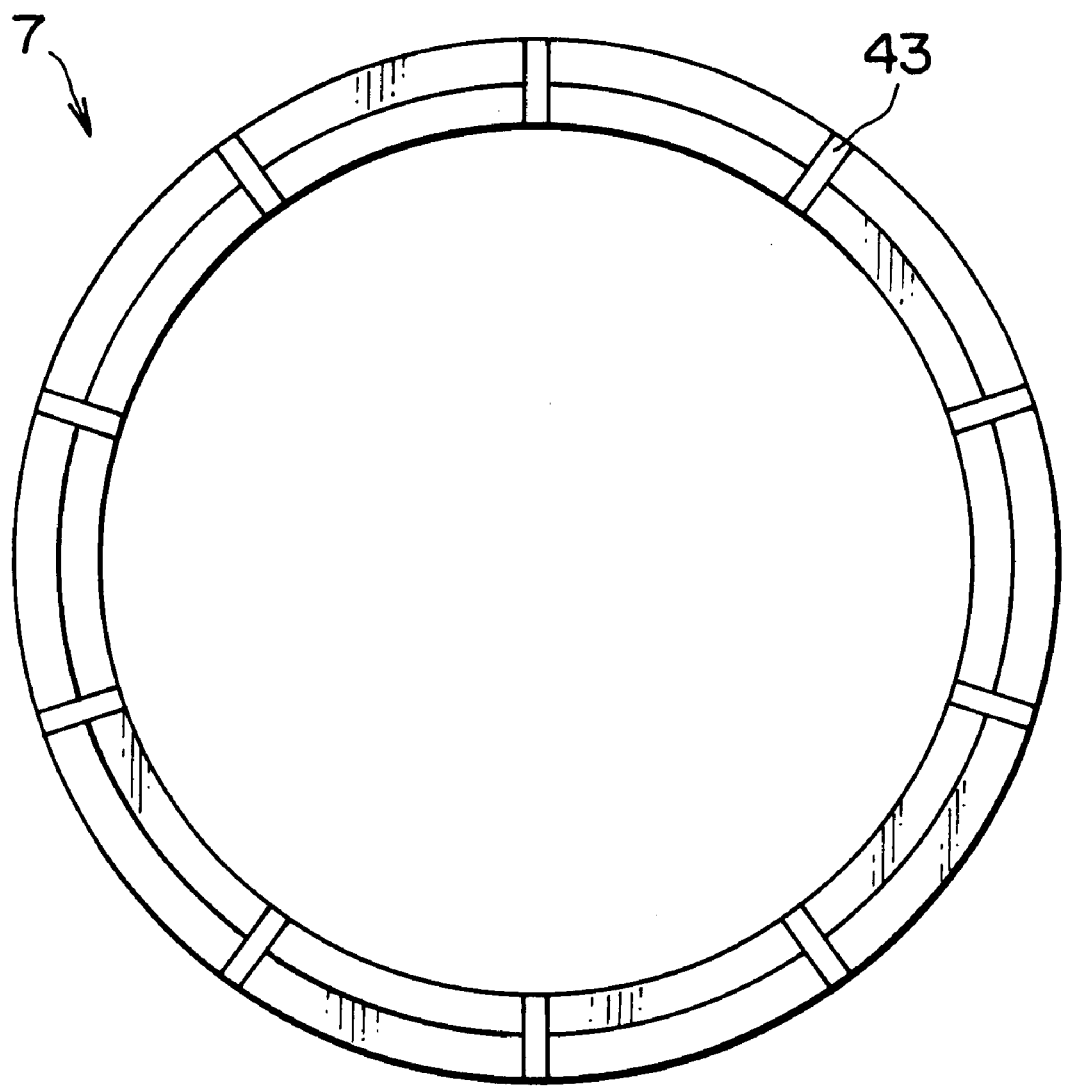
FIG. 5 is a front view of the outer race.
Figure 6:
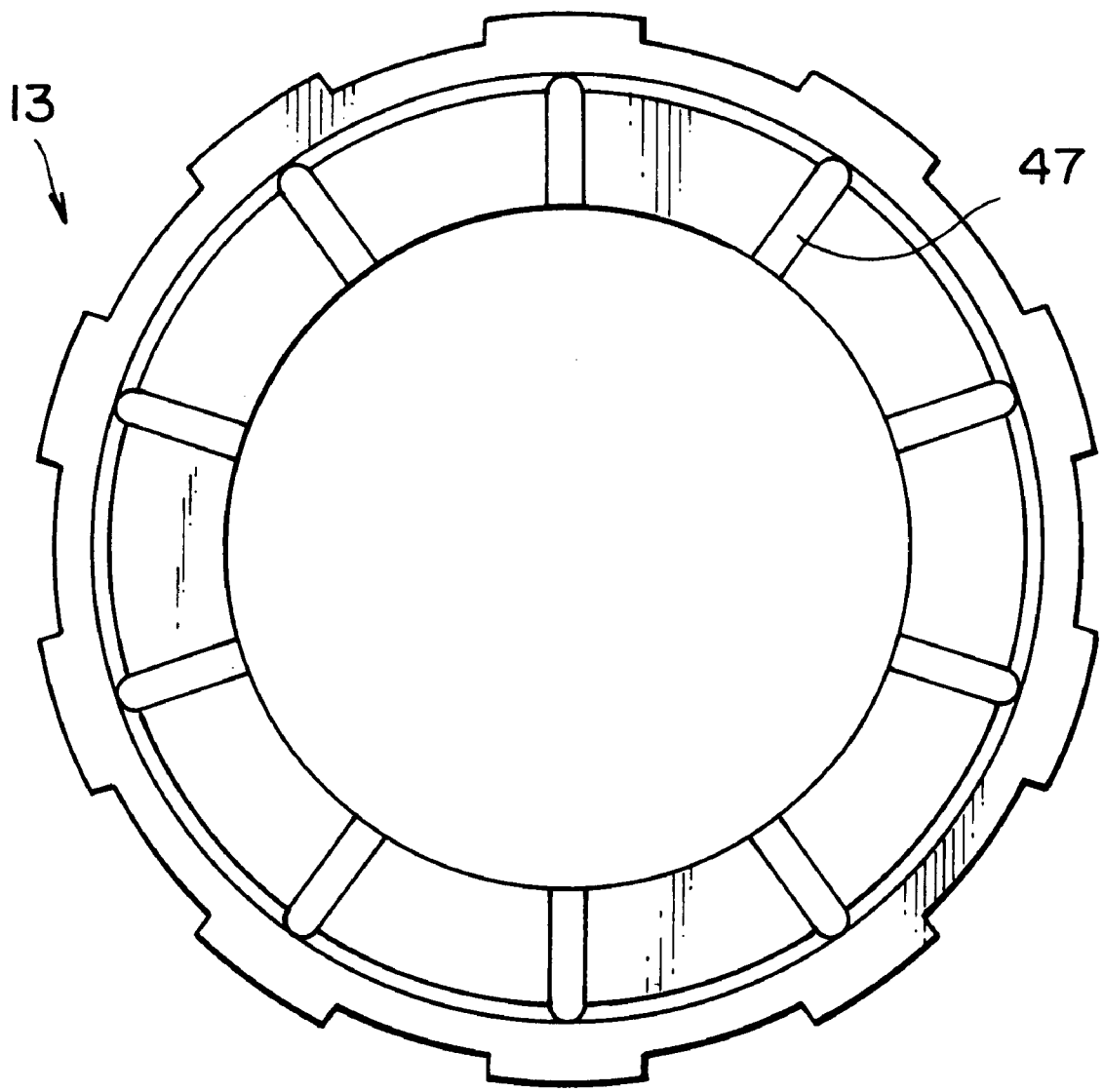
FIG. 6 is a back view of the rear retainer.
Figure 7:
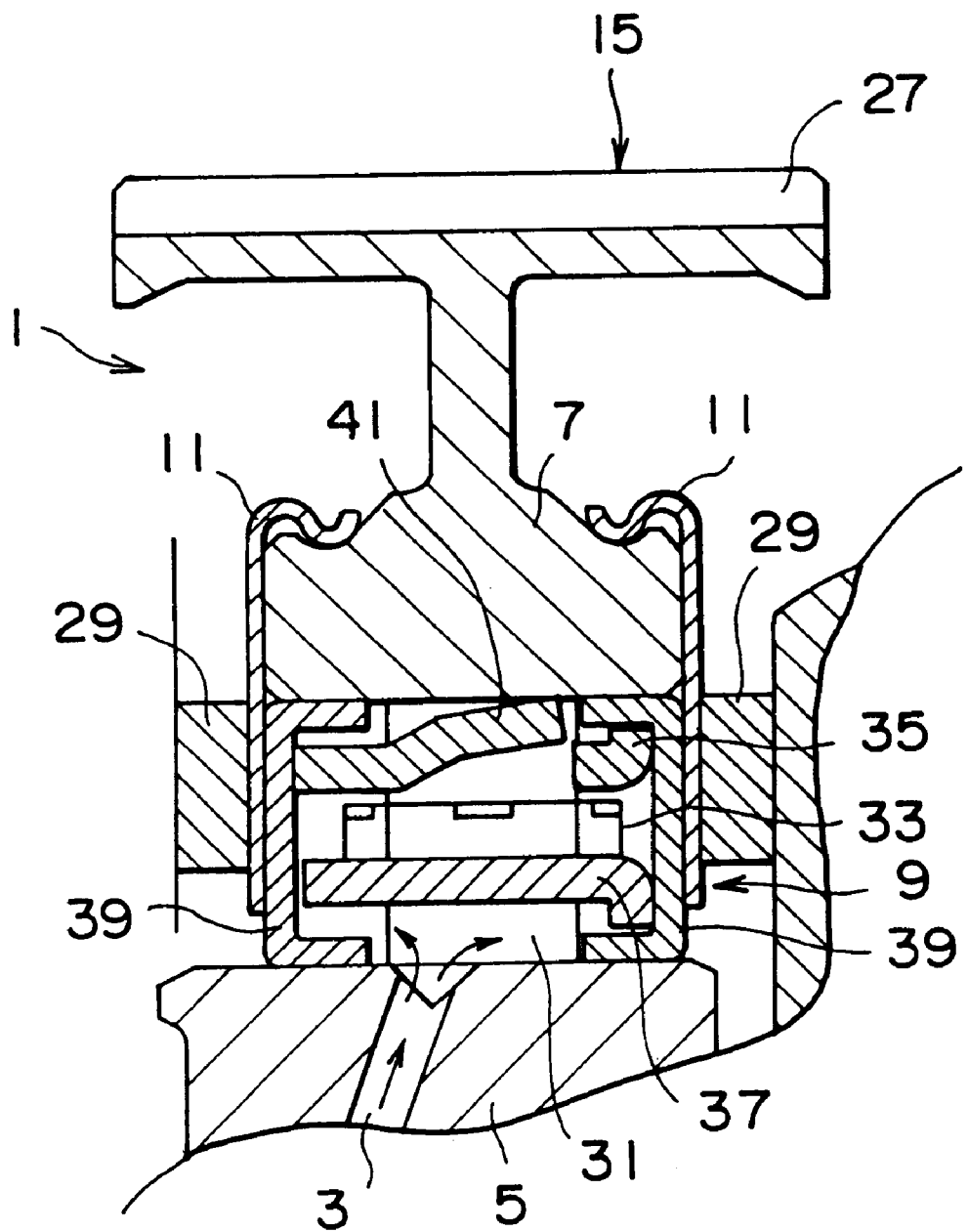
FIG. 7 is a longitudinal sectional view of the essential part of a conventional one-way clutch apparatus.

In the present embodiment, as shown in FIG. 5, a plurality of radial grooves 43 (ten in the illustrated example) are formed on the front end surface of the outer race 7, whereby radial front lubricating oil passages 45 are formed between the outer race 7 and the front retainer 11, as shown in FIG. 1. Also, as shown in FIG. 6, a plurality of radial grooves 47 (ten in the illustrated example) are formed on the rear end surface of the rear retainer 13, whereby rear lubricating oil passages 51 are also formed between the rear retainer 13 and the transmission element 49, as shown in FIG. 1.

An operation of the present embodiment will be described below.

When the automatic transmission is driven and the hub 15 or the inner race 5 is started to rotate, the lubricating oil which is supplied from an unrepresented oil hydraulic pump is exhausted through the lubricating oil supply bore 3. The exhausted lubricating oil is supplied into the one-way clutch mechanism 9, so as to conduct lubrication of the sprags 31, the ribbon spring 33, the outer retainer 35, the inner retainer 37, etc. This lubricating oil also conducts lubrication between the constituent elements of the one-way clutch mechanism 9, and the outer race 7 and the inner race 5.

Then, the lubricating oil scatters to the outer periphery of the one-way clutch mechanism 9 through the front and rear lubricating oil passages 45 and 51 by the action of centrifugal force, or the like, to wet or be caught by the inner surface of the hub 15. As a result, the friction plates or the separator plates of the wet-type multi-disc clutch are lubricated appropriately by the lubricating oil flowing through the lubricating oil supply bores 28 of the hub 15. Thus, the frictional surface is free from wear or burning for a long term.

On the other hand, in the present embodiment, since the rear retainer 13 is made of synthetic resin having lubricating performance, assembly of the rear retainer 13 in the outer race 7 becomes easier, and a Zytel washer is no longer required between the transmission element 49 and the one-way clutch mechanism 9. Consequently, it becomes possible to reduce the number of the constituent parts and the axial length of the automatic transmission.

The specific description of the embodiment is as stated above. However, modes embodying the present invention are not limited-to these embodiments. For example, the above embodiment shows the case in which the present invention is applied to a one-way clutch apparatus which is incorporated in a wet-type multi-disc clutch of an automatic transmission. However, the present invention may be applied to a one-way clutch which is incorporated in a wet-type multi-disc brake, or the like, and moreover, maybe applied to a one-way clutch apparatus, or the like, used for general industrial machines. In addition, the specific structure of the one-way clutch apparatus, the specific forms of the front and rear retainers, etc., may be appropriately varied within a scope of the gist and spirit of the present invention.

According to the present invention, in the one-way clutch apparatus which comprises the inner race on which a lubricating oil supply path open to the outer peripheral surface is formed, the outer race supported to be coaxial and relatively rotatable with respect to this inner race, the one-way clutch mechanism interposed between the inner race and the outer race, and the pair of retainers fixed to the both ends of the outer race for regulating an axial movement of the one-way clutch, the lubricating oil passage is formed between at least one of the retainers and the outer race for guiding the lubricating oil in the outer peripheral direction. As a result, the lubricating oil flowing into the one-way clutch mechanism is supplied to the wet-type multi-disc clutch, provided outward in the radial direction of the outer race through the lubricating oil passage, whereby wear caused by defective lubrication of the friction plate, etc., can be effectively prevented.

Also, in the one-way clutch of the present invention, one of the retainers may be extended from the hub of the frictional engagement means which is provided outwardly in the radial direction of the outer race. As a result, it is possible to realize weight reduction and cost reduction of the apparatus by, for example, forming the hub from steel plate by pressing and forming the retainers integrally with the hub.

Also, in the one-way clutch of the present invention, the other of the above retainers may be made from resin material and have the engagement portion which is engaged with the annular groove formed on the outer periphery of the outer race. As a result, it is possible to improve the productivity and to facilitate attachment and detachment of the retainers with respect to the outer race by, for example, molding the retainers of synthetic resin by injection, whereby it is also possible to omit the Zytel washer, depending on the lubricating performance of the material.

What is claimed is:

1. A one-way clutch apparatus, comprising:
   an inner race provided with a lubricating oil supply path open to an outer peripheral surface formed thereon;
   an outer race supported to be coaxial and relatively rotatable with respect to the inner race;
   a one-way clutch mechanism interposed between said inner race and said outer race, said one-way clutch mechanism including a plurality of locking elements, an outer retainer and an inner retainer, said locking elements being held by said outer and inner retainers to be movable between a torque transmitting position between said inner race and said outer race and a non-torque-transmitting position; and
   a pair of retainers respectively fixed to a front end and a rear end of said outer race to regulate axial movement of said one-way clutch mechanism,
   wherein a lubricating oil passage is formed between at least one of said pair of retainers and said outer race to guide the lubricating oil in a radially outward direction.

2. A one-way clutch according to claim 1, wherein said one of said pair of retainers is extended from a hub of a frictional engagement mechanism which is provided outward in the radial direction of said outer race.

3. A one-way clutch according to claim 1, wherein the other of said pair of retainers is made of resin material and has an engagement portion engaged with an annular groove formed on an outer periphery of said outer race.

4. A one-way clutch according to claim 2, wherein the other of said pair of retainers is made of resin material and has an engagement portion engaged with an annular groove formed on an outer periphery of said outer race.

5. A one-way clutch according to claim 2, wherein said outer race is formed with a plurality of radially extended grooves to form oil passages between the outer race and said one of said pair of retainers.

6. A one-way clutch according to claim 3, wherein the other of said pair of retainers is formed at a rear side face with a plurality of radially extended grooves to form oil passages between said other retainer and a transmission element.

7. A one-way clutch according to claim 4, wherein said outer race is formed with a plurality of radially extended grooves to form oil passages between the outer race and said one of said pair of retainers.

8. A one-way clutch according to claim 7, wherein the other of said pair of retainers is formed at a rear side face with a plurality of radially extended grooves to form oil passages between said other retainer and a transmission element.

9. A one-way clutch apparatus, comprising:
   an inner race provided with a lubricating oil supply path open to an outer peripheral surface formed thereon;
   an outer race supported to be coaxial and relatively rotatable with respect to the inner race;
   a one-way clutch mechanism interposed between said inner race and said outer race; and
   a pair of retainers respectively fixed to a front end and a rear end of said outer race to regulate axial movement of said one-way clutch mechanism,
   wherein a lubricating oil passage is formed between at least one of said retainers and said outer race to guide the lubricating oil in a radially outward direction, and
   the other of said retainers is made of resin material and has an engagement portion engaged with an annular groove formed on an outer periphery of said outer race.

10. A one-way clutch apparatus, comprising:

an inner race provided with a lubricating oil supply path open to an outer peripheral surface formed thereon;

an outer race supported to be coaxial and relatively rotatable with respect to the inner race;

a one-way clutch mechanism interposed between said inner race and said outer race; and a pair of retainers respectively fixed to a front end and a rear end of said outer race to regulate axial movement of said one-way clutch mechanism, wherein a lubricating oil passage is formed between one of said retainers and said outer race to guide the lubricating oil in a radially outward direction, said one of said retainers is fixed to the front end of said outer race and is extended from a hub of a frictional engagement mechanism which is provided outward in the radial direction of said outer race, and the other of said retainers is made of resin material and has an engagement portion engaged with an annular groove formed on an outer periphery of said outer race.

11. A one-way clutch according to claim 10, wherein said outer race is formed with a plurality of radially extended grooves to form oil passages between the outer race and said one retainer.

12. A one-way clutch according to claim 11, wherein said other retainer is formed at a rear side face with a plurality of radially extended grooves to form oil passages between said other retainer and a transmission element.

13. A one-way clutch apparatus, comprising:

an inner race provided with a lubricating oil supply path open to an outer peripheral surface formed thereon;

an outer race supported to be coaxial and relatively rotatable with respect to the inner race;

a one-way clutch mechanism interposed between said inner race and said outer race; and a pair of retainers respectively fixed to a front end and a rear end of said outer race to regulate axial movement of said one-way clutch mechanism;

wherein a lubricating oil passage is formed between one of said retainers and said outer race to guide the lubricating oil along a radially outward direction, said one retainer is extended from a hub of a frictional engagement mechanism which is provided outward in the radial direction of said outer race, and said outer race is formed with a plurality of radially extended grooves to form oil passages between said outer race and said one retainer.

14. A one-way clutch, comprising:

an inner race provided with a lubricating oil supply path open to an outer peripheral surface thereof;

an outer race supported to be coaxial and relatively rotatable with respect to the inner race;

a one-way clutch mechanism interposed between said inner race and said outer race; and at least one retainer axially adjacent to an end surface of said outer race to regulate axial movement of said one-way clutch mechanism, wherein a lubricating oil passage is formed between an axial end face of said one retainer and a surface adjacent thereto so as to guide the lubricating oil outwardly along said adjacent surface.

15. A one-way clutch according to claim 14, and having a plurality of said oil passages.

16. A one-way clutch according to claim 15, wherein said oil passages comprise grooves formed in one of said end face of said retainer and said adjacent surface.

17. A one-way clutch according to claim 14, wherein said adjacent surface is said end surface of said outer race.

18. A one-way clutch according to claim 17, wherein said oil passage comprises a groove formed in said end surface of said outer race.

19. A one-way clutch according to claim 14, wherein said adjacent surface is a surface of a transmission element.

20. A one-way clutch according to claim 19, wherein said oil passage comprises a groove formed in said end face of said one retainer.

21. A one-way clutch according to claim 14, wherein said one retainer is extended from a hub of a frictional engagement mechanism.

22. A one-way clutch according to claim 14, wherein said on e retainer has an engagement portion engaged with a circumferentially extending groove formed in an outer periphery of said outer race.

23. A one-way clutch according to claim 14, further comprising a second retainer axially adjacent to an opposite end surface of said outer race to regulate axial movement of said one-way clutch mechanism.

24. A one-way clutch according to claim 23, wherein a first lubricating oil passage is formed between said axial end face of said one retainer and the adjacent end surface of said outer race, and a second lubricating oil passage is formed between an axial end face of said second retainer and an adjacent surface of a transmission element.

25. A one-way clutch according to claim 24, wherein said one retainer is extended from a hub of a frictional engagement mechanism.

26. A one-way clutch according to claim 25, wherein said second retainer has an engagement portion engaged with a circumferentially extending groove formed in an outer periphery of said outer race.

27. A one-way clutch according to claim 24, wherein said second retainer has an engagement portion engaged with a circumferentially extending groove formed in an outer periphery of said outer race.

* * * * *